(No Model.)

I. F. PECK.
HOLLOW RIVET.

No. 422,824.    Patented Mar. 4, 1890.

Witnesses.
James W. Beaman
Mark A. Heath

Inventor:
Ira F. Peck
per S. Scholfield
Attorney

UNITED STATES PATENT OFFICE.

IRA F. PECK, OF PROVIDENCE, RHODE ISLAND.

HOLLOW RIVET.

SPECIFICATION forming part of Letters Patent No. 422,824, dated March 4, 1890.

Application filed November 14, 1889. Serial No. 330,321. (No model.)

*To all whom it may concern:*

Be it known that I, IRA F. PECK, a citizen of the United States, residing at Providence, in the State of Rhode Island, have invented a new and useful Improvement in Hollow Rivets, of which the following is a specification.

Heretofore hollow metallic rivets have been made from a solid rod of suitable size, which was turned down and drilled to form the required hollow shank; but this operation, though performed by means of automatic machinery, is a comparatively slow and expensive one, and it is the object of my invention to provide a hollow rivet which can be manufactured in a more economical and rapid manner; and my invention consists in a rivet having a compressed solid head joined to a hollow drawn shank by a neck of less diameter than the said shank, as hereinafter fully set forth.

Figure 1:
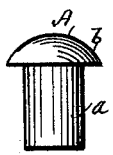
Figure 2:
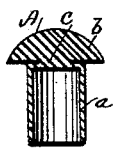
Figure 3:

Figure 1 represents a side view of my improved hollow rivet. Fig. 2 represents a longitudinal section of the same. Fig. 3 represents a modification.

In the accompanying drawings, A represents the rivet, which is provided with the hollow drawn shank $a$, the compressed solid head $b$, and the neck $c$, which connects the head and the shank, and is of less diameter than the said shank, all of the said parts being integral with each other.

As shown in Figs. 1 and 2, the head $b$ is compressed upon the base of the shank $a$, so that the neck $c$ has no appreciable length, but merely forms the connection between the head and shank; but in Fig. 3 the head and hollow shank are shown separated from each other by the neck $c$.

Hollow rivets as above described can be very rapidly and economically manufactured from solid wire by the method described in my application for Letters Patent, Serial No. 303,776, filed March 18, 1889, and in their manufacture the slow and expensive process of drilling out the shank of the hollow rivet, as heretofore, is avoided.

I claim as my invention—

A rivet having a solid head which is joined to a hollow cylindrical shank of uniform diameter by a solid neck of less diameter than the hollow shank, substantially as described.

IRA F. PECK.

Witnesses:
 SOCRATES SCHOFIELD,
 H. S. BABCOCK.